US007797530B2

(12) United States Patent
Moineau et al.

(10) Patent No.: US 7,797,530 B2
(45) Date of Patent: Sep. 14, 2010

(54) AUTHENTICATION AND ENCRYPTION METHOD AND APPARATUS FOR A WIRELESS LOCAL ACCESS NETWORK

(75) Inventors: Gilbert Moineau, Lachine (CA); Pierre Trudeau, Lorraine (CA); Stéphane Laroche, Lasalle (CA)

(73) Assignee: Hewlett-Packard Company, Palo Alto, CA (US)

( * ) Notice: Subject to any disclaimer, the term of this patent is extended or adjusted under 35 U.S.C. 154(b) by 971 days.

(21) Appl. No.: 10/276,334

(22) PCT Filed: Apr. 9, 2001

(86) PCT No.: PCT/CA01/00466

§ 371 (c)(1), (2), (4) Date: Nov. 27, 2002

(87) PCT Pub. No.: WO02/082730

PCT Pub. Date: Oct. 17, 2002

(65) Prior Publication Data

US 2004/0215957 A1  Oct. 28, 2004

(51) Int. Cl.
*H04L 29/06* (2006.01)
(52) U.S. Cl. .................. 713/153; 709/238; 370/351
(58) Field of Classification Search ............. 713/153, 713/152; 709/238
See application file for complete search history.

(56) References Cited

U.S. PATENT DOCUMENTS

| 6,092,191 | A  | * | 7/2000 | Shimbo et al. ............ 713/153 |
| 6,400,722 | B1 | * | 6/2002 | Chuah et al. ............. 370/401 |
| 6,614,781 | B1 | * | 9/2003 | Elliott et al. ............ 370/352 |
| 6,763,469 | B1 | * | 7/2004 | Daniely ................... 726/11 |
| 6,907,532 | B2 | * | 6/2005 | Jari et al. ................ 726/15 |
| 7,028,183 | B2 | * | 4/2006 | Simon et al. ............. 713/168 |
| 7,035,281 | B1 | * | 4/2006 | Spearman et al. ......... 370/465 |
| 7,324,547 | B1 | * | 1/2008 | Alfieri et al. ............ 370/461 |
| 7,389,533 | B2 | * | 6/2008 | Bartlett et al. ........... 726/15 |
| 7,451,222 | B2 | * | 11/2008 | Sullivan ................. 709/227 |
| 7,653,200 | B2 | * | 1/2010 | Karmi et al. ............. 380/270 |
| 2001/0037407 | A1 | * | 11/2001 | Dragulev et al. ......... 709/250 |
| 2002/0136375 | A1 | * | 9/2002 | Bouffard et al. ......... 379/114.01 |

(Continued)

FOREIGN PATENT DOCUMENTS

EP  0 917 320 A2  5/1999

(Continued)

OTHER PUBLICATIONS

Murthy U. et al, "Firewalls for Security in Wireless Networks", Proceedings of the 31$^{st}$, Hawaii International Conference, Kohala Coast, HI, USA, Jan. 6-9, 1998, pp. 672-680.

(Continued)

*Primary Examiner*—Farid Homayounmehr

(57) ABSTRACT

This invention pertains to the field of Wireless Local Area Network (WLAN). This invention allows a secure connection of a user client station to a base unit. The secure connection comprises the use of authentication and encryption means. The base unit comprises a switching unit, at least one firewall, an authentication/encryption unit and at least one port device. The invention also provides a secure roaming scheme when a roaming is performed by a wireless user.

15 Claims, 4 Drawing Sheets

U.S. PATENT DOCUMENTS

2002/0169980 A1* 11/2002 Brownell .................... 713/201
2005/0169288 A1* 8/2005 Kamiwada et al. .......... 370/401

FOREIGN PATENT DOCUMENTS

GB    2 316 841    3/1998

WO    WO 01/19050 A2    3/2001

OTHER PUBLICATIONS

Prasad A.R. et al. "Security Architecture for Wireless Lans: Corporate & Public Environment", Proceedings of the 2000 IEEE $51^{st}$. Vehicular Technology Conference, Tokyo, Japan, vol. 1, May 15-18, 2000, pp. 283-287.

* cited by examiner

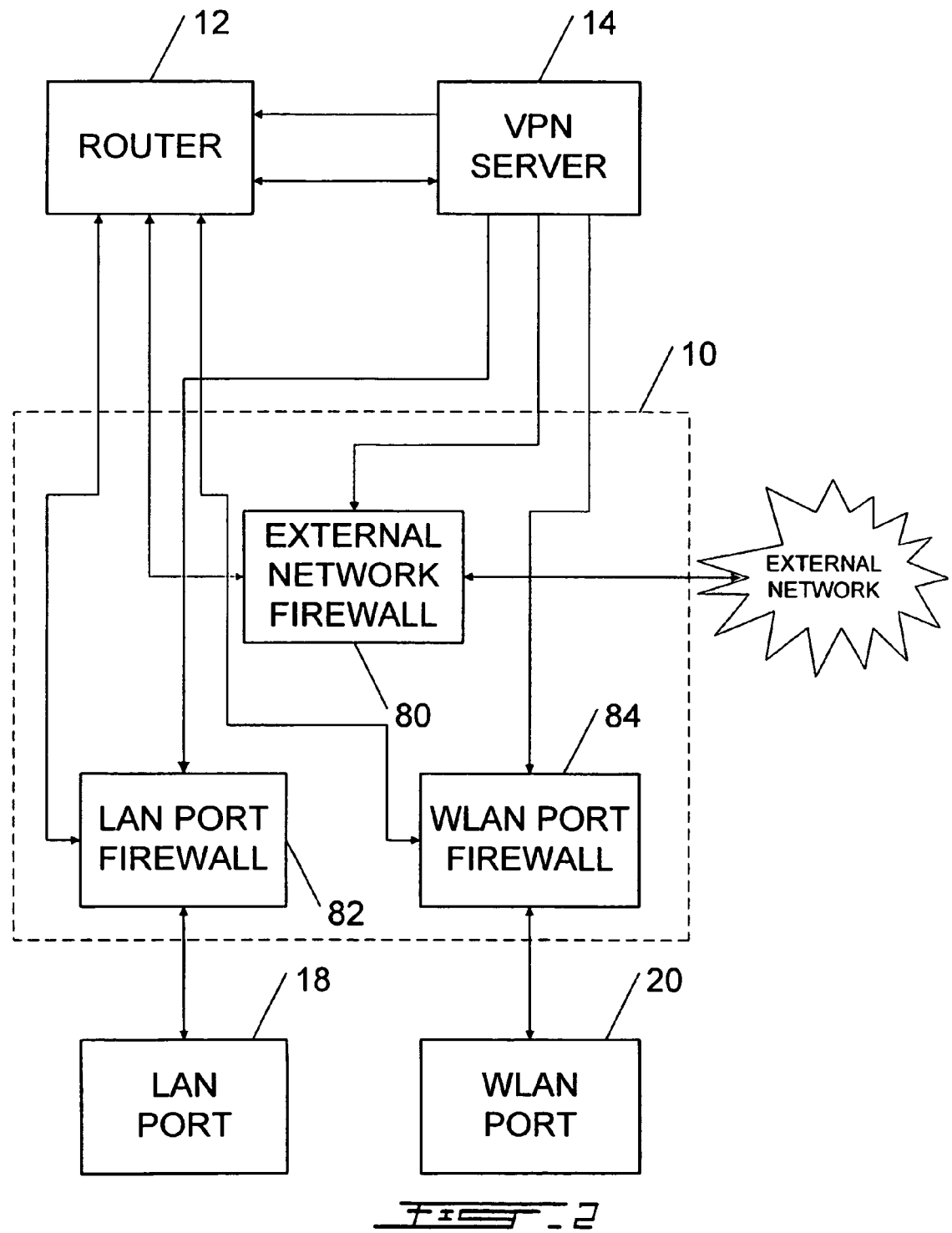

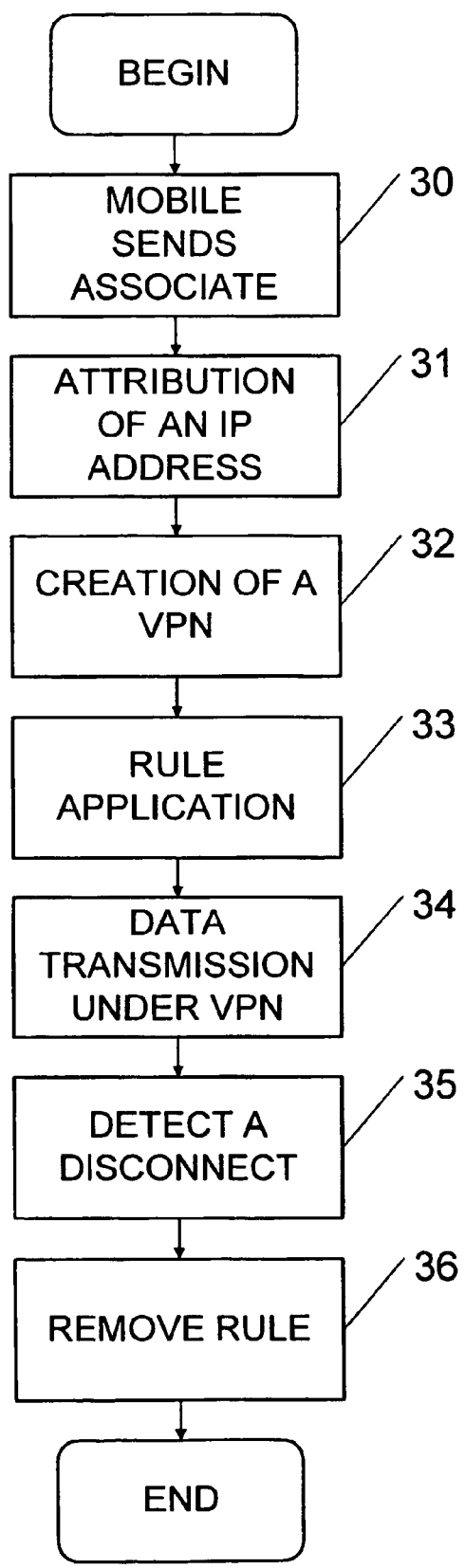

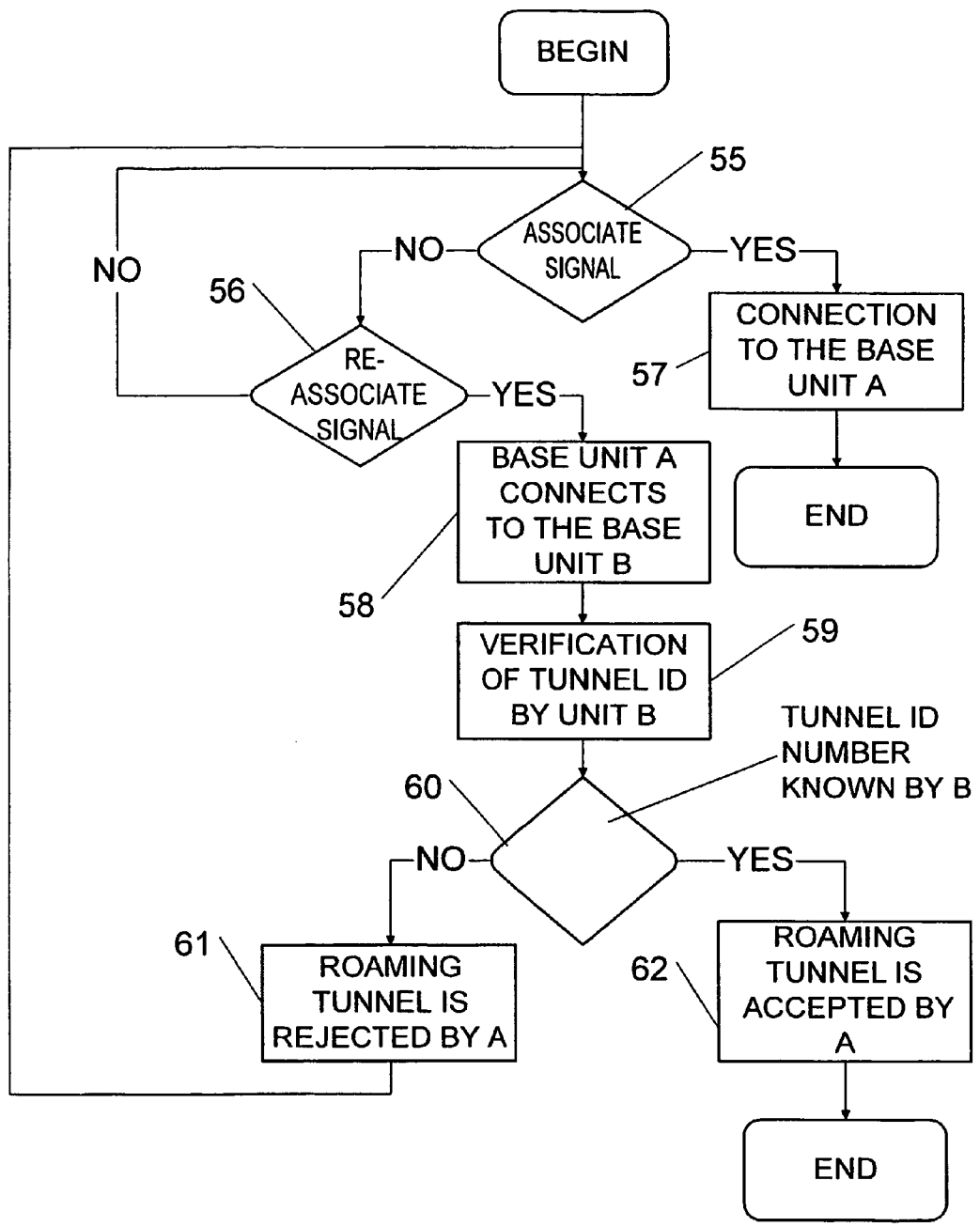

AUTHENTICATION AND ENCRYPTION METHOD AND APPARATUS FOR A WIRELESS LOCAL ACCESS NETWORK

FIELD OF INVENTION

This invention relates to security across a Wireless Local Access Network (WLAN). More precisely, this invention relates to securing a wireless IEEE802.11 data network using a Virtual Private Network (VPN).

BACKGROUND OF INVENTION

Wireless data networks are becoming more and more a reality for end-users, especially for corporate users who are nomadic by essence. Users and system administrators of the corporate world especially seek powerful, reliable and secure wireless data networks. These Wireless Local Area Networks (WLAN) will improve productivity with a real-time access to information regardless of worker position. They will also provide a cost effective network setup for locations which are hard to wire.

But the security is one of the most important issues when dealing with data transfer. When LANs were operated without any connection with the outside world and when the connections between computers were done using wires, security was a concern inside the company. Today, because LANs are interconnected with other LANs or Wide Area Networks (WAN) such as the Internet and also because the current trend for copper is to disappear, solving the security issue is important.

To secure a transmission, two basic steps are usually done: an encryption step and an authentication step. Each of these two steps is important: the encryption step ensures that the communication between the sender and the receiver will not be understood by a third party while the authentication ensures the receiver that the sender was the real one.

Encryption is usually achieved with algorithms that use a key to encrypt and to decrypt messages by turning data into unintelligible digital data and then by restoring it to its original form. The longer the key is, the more computing resources are required to complete the task. Encryption can be performed using at least two different schemes: a single key encryption and a public/private key encryption. With a single-key encryption, both the sender and receiver use the same key to encrypt and decrypt messages. The drawback is that the sender has to get the key from the receiver somehow, without it being intercepted. When using public/private keys, algorithms are used that encrypt messages with the public key and permits decryption only by the private key. User A can openly publish his "public" key, and if user B uses it to encrypt a message, the message turns into incomprehensible data that can only be decoded with user A's secret, "private" key.

A cornerstone of such a Wireless LAN system is the ability to inter-operate with products from different manufacturers. The Institute of Electrical and Electronics Engineers (IEEE) ratified the original 802.11 in 1997 as the standard for WLANs. In September 1999, the IEEE ratified the 802.11b, which offers an improvement in terms of speed, with transmissions up to 11 Mbps. This new and powerful standard ensures a bandwidth comparable with the one provided by Ethernet 10 Mbps. This wireless network operates in the 2.4 GHz ISM frequency band.

The wireless LAN described in the 802.11 standard is composed of two different elements: a mobile unit which is usually integrated in a PCMCIA type card and an access point (AP). The mobile unit contains the wireless elements that will ensure the wireless connectivity of the mobile user to the access point. Usually the access point can provide, using a gateway, a connection to another LAN or WAN such as the Internet. Such architecture enables a mobile user to access almost any network.

In standard 802.11, there are two different modes of communication: infrastructure mode and adhoc mode. In the infrastructure mode, the wireless network consists of at least one access point and one mobile unit. This configuration is referred to as a Basic Service Set (BSS); when more than one BSS are forming a sub network, an Extended Service Set (ESS) is created. The adhoc mode or peer-to-peer mode consists in a set of more than one mobile unit which communicate together directly without using an access point. This mode can be useful when information has to be transmitted directly between two users and when no access points are available.

The OSI data link layer is divided into two sub layers within standard IEEE 802.11: the Logical Link Control (LLC) and the Media Access Control (MAC). While the LLC sublayer is the same for IEEE 802.3 and IEEE 802.11, MAC sublayer is different in the two standards. In IEEE 802.11, Carrier Sense Multiple Access with Collision Avoidance (CSMA/CA) is used instead of Carrier Sense Multiple Access with Collision Detection (CSMA/CD) for IEEE 802.3. In order to avoid collision, CSMA/CA uses packet acknowledgement (ACK). The packet acknowledgement is used whenever a packet has been sent and well received by a destination to confirm the operation to the sender. This acknowledgement concept does not exist under standard 802.3. It is also worth noting that standard 802.11 implements two interesting features: a CRC checksum and a packet fragmentation operation. This CRC checksum allows the detection at the data link layer of an error, that was previously detected, under 802.3, at a higher layer. The packet fragmentation operation allows to dynamically modify the size of the packet to be transmitted in the ether, which can be necessary, especially when the system is overcrowded. This previously described features adds some overhead in comparison to the 802.3 MAC sublayer but ensures robustness of the standard.

However the frame added by the MAC sublayer still comprises the sender MAC address and the receiver MAC address.

The security of this IEEE 802.11 comprises an encryption mechanism and an access control. The encryption mechanism is known as the Wired Equivalent Protection (WEP) protocol and the access control ID is known as the ESSID (WLAN service ID). To access an access point, a mobile unit must have the ESSID identifier of this access point. The WEP consists in a RC4 encryption protocol with a 40 bit or 128 bit shared key. If the encryption is enabled, all data transmitted are encrypted including the authentication process. As mentioned previously, the encryption scheme used in WEP uses shared keys. These keys need to be entered by the user in order to access the system. The security developed within the system suffers from serious limitations, as it will be explained below.

First, as WEP is based upon a shared private key scheme, and as very few keys are available (4 keys are typically available), the network administrator must check and track efficiently the owner of each of the keys. The keys on each mobile units must match the keys in the access point; when a key is changed, the administrator must go on each user PC and configure the new keys. The size of the key is limited to 40 bits in one version of the standard. This size is very small and hardware could be implemented to crack such a key almost in real time, allowing an almost complete access to any communications in the WLAN access point.

Furthermore, WEP only protects the data portion of the OSI link layer. The physical layer transmissions are available for sniffing.

By default the encryption feature is turned off, this can allow a malicious roaming user to access corporate intranets that are not well configured.

At this OSI link layer level, there is no way to make a distinction between two different users that share the same key unless the MAC address of the user is used. It is also important to notice that, in some cases, the MAC address of the mobile unit can be reconfigured, meaning that a malicious user can access the traffic dedicated to another user.

Thus, in view of the foregoing elements, there is a need for a security enhancement in a Wireless LAN of the type according to 802.11 standard.

SUMMARY OF THE INVENTION

It is an object of the present invention to provide a way to uniquely authenticate a user in a wireless local area network (WLAN).

It is another object of the present invention to provide a way to encrypt, for each user of a wireless network, the data transmitted over a wireless link between the user and the Access Point (AP).

It is an object of the present invention to restrict the access to an authorized mobile user.

It is another object of the present invention to allow a user of an Extended Service Set (ESS) to roam from one Access Point to another Access Point without compromising such a secure connection.

It is another object of the present invention to provide defined rights for each user of a network.

According to one aspect of this invention there is provided an apparatus for secure communication between at least one user client station via at least one port device and a network, the apparatus comprising at least one firewall, each of the at least one firewall being connected to one of the at least one port device, an authentication/encryption unit having a configuration data path connected to each of the at least one firewall, a switching unit for transmitting data connected to each of the at least one firewall and to the authentication/encryption unit, wherein a new user client station has permission at the at least one firewall to access only an authentication function of the authentication/encryption unit until the authentication/encryption unit communicates a permission profile for the new user over the configuration data path.

According to another aspect of the invention there is provided a method for secure communication between at least one user client station via at least one port device and a network, each of the at least one port device being connected to a firewall, the firewall being connected to a switching unit and to an authentication/encryption unit using a configuration path, the method comprising the steps of establishing an authentication link between at least one of the at least one user client station and the authentication/encryption unit, authenticating the at least one of the at least two user client stations and retrieving a profile, applying the profile configuration to the at least one of the firewall using the configuration path; and allowing the at least one user client station to communicate according to the profile configuration, if the authentication is successful.

BRIEF DESCRIPTION OF THE DRAWINGS

The invention will be better understood by an examination of the following description, together with the accompanying drawings, in which

FIG. 2 shows a detailed base unit (BU); the base unit comprises a firewall system; the firewall system comprises 3 independent firewalls;

FIG. 3 shows the sequence of operations performed when a mobile unit wants to connect to a base unit via an access point of the Wireless Local Area Network;

FIG. 4 shows the sequence of operations performed when a mobile is performing a roaming from a base unit to another base unit;

PREFERRED EMBODIMENT

Figure 1:
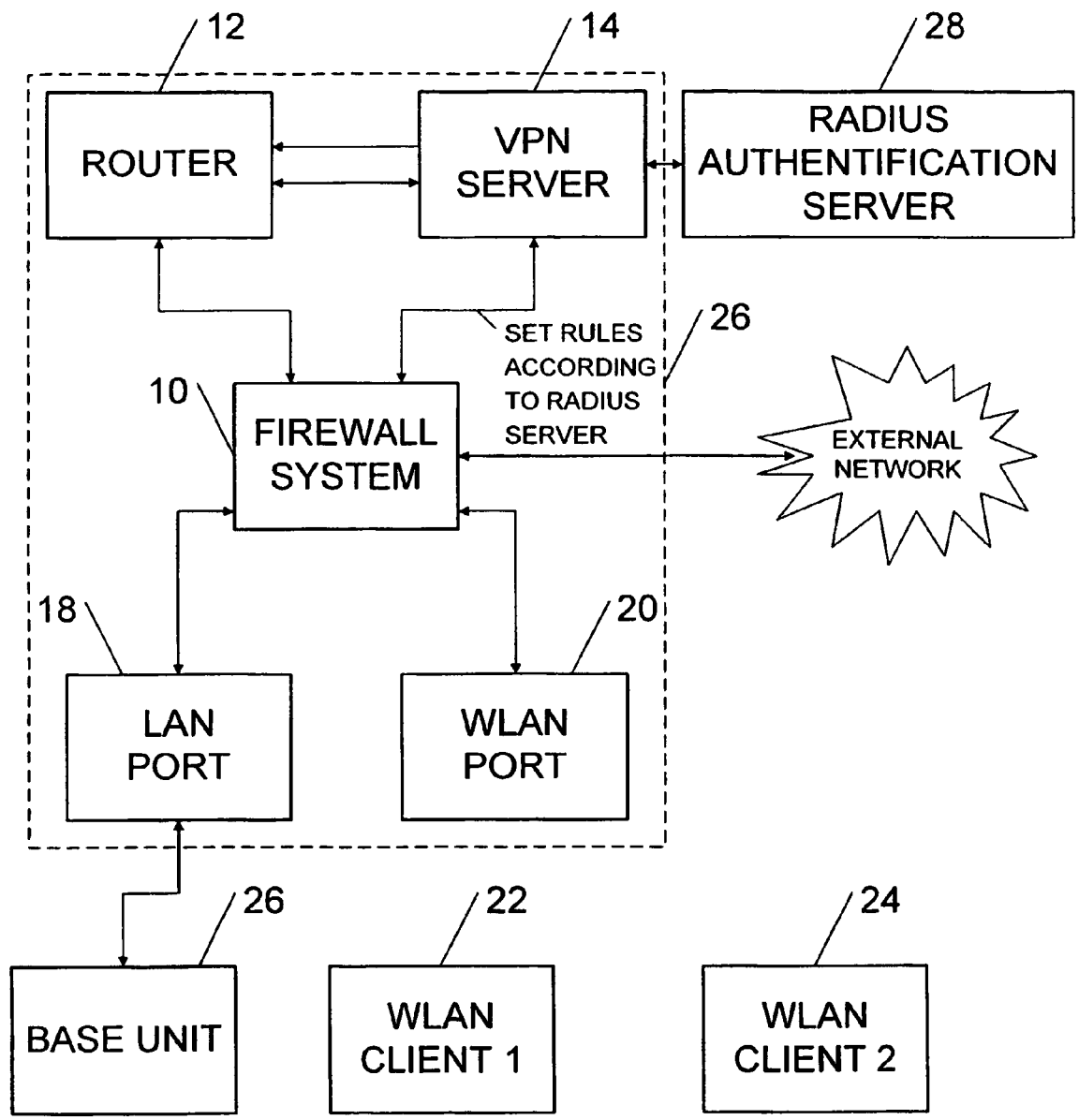
FIG. 1 shows a base unit (BU) with two mobile units; the base unit is connected to another base unit, to a Wide Area Network (WAN) and to a Radius authentication server.

Now referring to FIG. 1, there is shown a base unit 26, which is, in the preferred embodiment, a CN1000 from Colubris Networks.

The base unit 26 comprises a firewall system 10, a router 12, a VPN server 14, a WLAN port 20 and a LAN port 18.

The firewall system 10 controls the traffic coming from an external network as well as the traffic coming from the WLAN port 20 and the traffic coming from the LAN port 18. The firewall system 10 is also connected to the router 12. The firewall system 10 is set-up by the VPN server 14 based on the user profile received from the Radius authentication server 28. It is set-up according to access policies defined by the system administrator of the system. The access policies may comprise rules for each user.

Now referring to FIG. 2, there is shown a firewall system. In the preferred embodiment of the present invention, the firewall system 10 comprises three different firewalls. The external network firewall 80 is connected to the router 12 and to the external network; it is controlled by the VPN server 14. The WLAN port firewall 84 is connected to the WLAN port 20 and to the router 12; it is controlled by the VPN server 14. The LAN port firewall 82 is connected to the router 12 and to the LAN port 18; it is controlled by the VPN server 14.

Now referring back to FIG. 1, a router 12 directs the flow of information according to the network topology. The incoming traffic from the firewall system 10 and the VPN server 14 is routed according to these policies.

The VPN server 14 handles, in the preferred embodiment of the present invention, the transmission which involves a user assigned specifically to the WLAN port 20 of this base unit 26. It will be appreciated that the VPN server 14 does not handle necessarily, in the preferred embodiment of the present invention and as explained below, all the users connected to the WLAN port 20. In the preferred embodiment of the present invention the Point to Point Tunneling Protocol (PPTP) is used by the VPN server 14.

A WLAN port 20 is connected to the firewall system 10. The WLAN port 20 is, in the preferred embodiment, IEEE802.11 compliant. It allows the connection of several mobile units according to IEEE802.11 standard.

FIG. 1 shows two mobile units 22 and 24 connected to the base unit 26, via the WLAN port 20. The LAN internal port 18 allows the connection of a base unit 26 to at least one other base unit 26 and more generally to a LAN. In the preferred embodiment, the connection is performed using an Ethernet connection. FIG. 1 shows a group of two base units 26 connected together and a Radius authentication server 28. The purpose of the Radius authentication server 28 will be explained below. In another embodiment, the base unit 26 could include more than one WLAN port 20 in order to increase the number of mobile units that could be connected to the wireless network.

In FIG. 1, the two base units 26 create an extended service set. This extended service set allows a greater geographic coverage of a surface. A mobile unit user can roam from one base unit 26 to another base unit of the extended service set. The roaming is performed in a secure way, as it will be explained below.

In the preferred embodiment, each base unit 26 is located on a same subnet in order to facilitate the roaming. In another embodiment, base unit 26 and the Radius authentication server 28 could be separated by a WAN. In such a configuration, proper security measures are mandatory in order to maintain the system's integrity. These security measures comprise at least a secure connection between the base unit 26 and the Radius authentication server 28, using a tunneling protocol for example.

A mobile unit 22 can communicate with another mobile unit 24 via the WLAN port 20, the firewall system 10 and the router 12 and according to the infrastructure mode defined in IEEE802.11. In such a case, a first encrypted link is created between the mobile unit 22 and the VPN server 14 and then a second encrypted link is created between the VPN server 14 and the mobile unit 24. Mobile unit 22 can also be connected to a mobile unit 24 using the adhoc mode defined in the standard. In the preferred embodiment, the adhoc mode is disabled.

The mobile unit 22 can also communicate with a computer located in an outer LAN or WAN. In such a case, an encrypted link is created between the mobile unit 22 and the VPN server 14 via the firewall system 10 and the router 12. The VPN server then sets the rules on the firewall system 10 of the base unit 26, based on the user profile stored in the Radius authentication server. In another embodiment, a Lightweight Directory Access Protocol (LDAP) device might be used to store the user profile as well as any other pertinent information. The VPN server 14 then sends either unencrypted or encrypted traffic to the external network via the router 12 and the firewall system 10. It will be appreciated that the link between the mobile unit 22 and the VPN server 14 is encrypted.

Mobile unit 22 can finally communicate with another user 24 connected to the WLAN access point of another base unit 26 connected to the base unit where the mobile unit 22 is, via the LAN internal port 18. In such a case, an encrypted link is created between the mobile unit 22 and the VPN server 14 via the WLAN port 20, the firewall system 10 and the router 12. The VPN server 14 sets the firewall system 10 according to the particular rule for this user. In this particular case, the traffic will exit the base unit 26 via the router 12, the firewall system 10 and the LAN port 18. It will be appreciated that the traffic between the VPN server 14 and the other base unit 26 is unencrypted.

In another embodiment of the present invention, all the outgoing traffic of the VPN server 14 is encrypted, notwithstanding of its destination.

In another embodiment, it will be appreciated that a central VPN server 14 might be used for a plurality of base units 26 instead a one dedicated for each of the base units 26. The central VPN server would handle in such embodiment all VPN connections to each of the base units 26. In this case, the firewall of each base unit 26 will only accept traffic on WLAN port 20 inside a VPN tunnel to the Central VPN server.

Connection of a Mobile Unit to a Base Unit

Now referring to FIG. 3, there is shown a flow chart of the operations performed in order to securely connect a mobile unit to a base unit 26 via a WLAN port 20. If VPN security is used, the mobile unit must open a PPTP connection, in the preferred embodiment of the invention, with the VPN server 14, running in one of the WLAN port 20 or with a centralized VPN server located on the wired network to which the base unit 26 are connected.

When an administrator has selected VPN security, the access point sets-up the filters of the firewall system 10 to make sure that only the wireless traffic that comes through a valid PPTP connection is accepted.

This new VPN connection will be used to authenticate the user of the mobile unit 22 and encrypt further wireless communication. In the preferred embodiment, a Point to Point Tunneling Protocol (PPTP) VPN connection is used. In another embodiment IPSec standard as well as L2TP protocol might be used. This PPTP VPN connection is established, in the preferred embodiment, using CHAP or any other secure authentication protocol. Once the new VPN connection is created, policies related to this particular user are loaded into the firewall system 10 by the VPN server 14 according to step 33 of FIG. 3. These policies are created by the system administrator for each user or each group of users and are stored into the Radius authentication server 28. According to these policies, a user may have or not the right to access certain part of the network; a user may be unreachable by other users etc.

According to step 34, the user in the mobile unit 22 shares information with other entities according to its particular profile. It will be appreciated that this exchange of information is done safely for the user and the wireless local access network as a VPN is created between the WLAN port 20 and the mobile unit 22. All information sent by the mobile unit 22 is collected by the WLAN port 20 and is sent to the VPN server 14 via the firewall system 10 and the router 12. The mobile user 22 has been authenticated and the communication is encrypted. Furthermore, the mobile unit 22 has been also identified. According to step 35, a detection of a disconnection of the mobile unit 22 is performed by the base unit 26. This disconnection's detection is based on data received by the base unit 26 and it is done according to IEEE802.11 standard or if the VPN connection is closed. If a disconnection of the mobile unit 22 is detected by the base unit 26, policies related to the user of the mobile unit 22, which were loaded into the firewall system 10 by the VPN server 14 according to step 33 are removed according to step 36 of FIG. 3.

These steps ensure that a total check is performed on any user and its related device that wants to connect to the system. Such security scheme goes far beyond the protection given by the WEP implemented within IEEE802.11.

Roaming of a Mobile Unit in an Extended Service Set

Now referring to FIG. 4, there is shown, more particularly, the operations performed during the roaming of a mobile unit 22 from one WLAN port 20 of a base unit 26 to a WLAN port 20 of another base unit 26 of the same subnet. The roaming is performed when a wireless signal stronger than the current signal is detected. According to IEEE802.11, a "re-associate" request is issued by the mobile unit 22 to the new base unit 26. According to this invention, special features are implemented, as explained below, to ensure an efficient and secure traffic transition from one WLAN port 20 to another WLAN port 20. It will be appreciated that with the current invention, the flow of information is uninterrupted during the roaming. According to step 55, if base unit 26 detects an "associate" request, the operations, previously described must be performed to ensure a secure connection. This is summarized by step 57 and previously explained in FIG. 3. If a "re-associate" request is received, according to step 56 of FIG. 4, a mobile unit 22 wants to roam from one base unit, named B to this new base unit, named A. Names A and B are only used for the sake of explanation. The unit A was also configured for VPN security, so only VPN traffic is allowed through the wireless port of unit A. The "roaming" tunnel is considered as valid traffic by the firewall system of unit A.

Assuming a roaming from base unit B to base unit A as described before, the VPN connection still exists between the mobile unit 22 and the base unit B, but the traffic takes a different path.

The traffic received by the WLAN port 20 of the base unit A is forwarded to the firewall system 10 and to the router 12 of the base unit A. The router 12 of the base unit A then forwards the traffic to the LAN port 18 of the base unit B via the firewall system and the LAN port of the base unit A. The traffic received by the LAN port 18 of the base unit B is then forwarded to the VPN server 14 of the base unit B via the firewall system 10 and the router 12 of the base unit B. During the roaming the router 12 as well as the firewall system 10 of base units A and B are updated. The router 12 and the firewall system 10 of base unit A are set to be able to forward the traffic to the base unit B.

The VPN server 14 of the base unit B therefore handles the connection with the mobile user 22 connected to the WLAN port 20 of the base unit A.

In another embodiment of the present invention the base unit A might check with the base unit B if the traffic is valid prior to forward the traffic to the base unit B. The check might be performed in one embodiment of the present invention using a connection between the LAN ports 18 of base unit A and base unit B.

The invention claimed is:

1. An apparatus for secure wireless communication between at least one user mobile client station and a network to which the apparatus is connectable, the apparatus comprising:
    a base unit communicatively coupled to an external network as a wireless access point, the base unit including:
        a port configured for wireless communication with one or more mobile clients;
        a firewall connected to the port and configured to control communications from the external network and the port;
        a virtual private network (VPN) server connected to, and controlling, the firewall;
        a router connected to the firewall and to the VPN server; and
    the one or more mobile clients communicatively coupled wirelessly with the base unit;
    wherein the one or more mobile clients have initial permission at the firewall to access only an authentication function of the VPN server until the VPN server communicates to the firewall a permission profile for a respective mobile client, whereupon a corresponding VPN tunnel connection is established for an authenticated mobile client to the VPN server, the VPN server loading rules into the firewall to accept communications from the authenticated mobile client only through the corresponding VPN tunnel connection;
    wherein communications between authenticated mobile clients are transmitted through the router and secured through both the firewall and the corresponding VPN tunnel connection established from each respective authenticated mobile client to the VPN server;
    wherein a given wireless communication is encrypted using the VPN tunnel connection established to the VPN server; and
    wherein a wireless communication received at the firewall addressed to a VPN server associated with another apparatus is allowed to pass through the firewall and the router to the VPN server of the other apparatus.

2. The apparatus as claimed in claim 1, wherein for each VPN tunnel connection the router creates a first link between the VPN server and the firewall and a second link between the VPN server and the firewall, the first and second links being secure as a result of encryption by the VPN server and filtering by the firewall.

3. The apparatus as claimed in claim 1, further comprising a set of one or more security profiles, wherein the VPN server uses a given security profile to manage the firewall for a particular one of the one or more mobile clients.

4. The apparatus as claimed in claim 1, wherein the VPN server uses PPTP protocol for the VPN tunnel connections.

5. The apparatus as claimed in claim 1, wherein the VPN server uses IPSec for the VPN tunnel connections.

6. The apparatus as claimed in claim 1, wherein the VPN server uses L2TP protocol for the VPN tunnel connections.

7. The apparatus as claimed in claim 3, wherein a given security profile has at least one rule established at a RADIUS authentication server communicatively coupled to the VPN server.

8. The apparatus as claimed in claim 3, wherein a given security profile is storable in a database according to a Lightweight Directory Access Protocol (LDAP).

9. The apparatus as claimed in claim 1, wherein the wireless communications between a second base unit and the VPN server are unencrypted.

10. The apparatus as claimed in claim 1, further including a local area network port allowing an external device to be connected to the apparatus, wherein traffic from the one or more mobile clients to the external device is unencrypted after passing through the VPN server.

11. The apparatus as claimed in claim 1, wherein the base unit is connected to a wide area network.

12. The apparatus as claimed in claim 1, wherein the VPN server is connectable to a database unit having one or more security profiles, the database unit being connected to the VPN server via a wide area network.

13. A method for secure wireless communication between a mobile client and a network via an access point, the access point comprising a port, a Virtual Private Network (VPN) server, a router, and a firewall, the method comprising:
    establishing an authentication link between the mobile client and the VPN server via the firewall and the port;
    authenticating the mobile client; and
    after successful authentication of the mobile client:
        retrieving to the firewall a profile associated with the authenticated mobile client;
        establishing a VPN tunnel connection for the authenticated mobile client to the VPN server;
        applying the profile at the firewall, allowing the authenticated mobile client to communicate data via the router, secured through both the firewall according to the profile and the VPN tunnel connection to the VPN server; and
    communicating the data to a second mobile client via a second VPN tunnel connection that is established for the second mobile client to the VPN server, the second mobile client station having been authenticated by the VPN server;
    encrypting the wireless communication between each mobile client and the VPN server; and
    wherein the mobile client has initial permission at the firewall to access only an authentication function of the VPN server until the VPN server communicates to the firewall a permission profile for a respective mobile client, and wherein a wireless communication received at the firewall addressed to a VPN server associated with another access point is allowed to pass through the firewall and the router to the VPN server of the other access point.

14. The method as claimed in claim 13, further comprising removing the profile from the firewall upon detecting a disconnection from the access point of the mobile client.

15. The method as claimed in claim 13, further comprising removing the profile from the firewall upon closing of the VPN tunnel connection for the mobile client.

* * * * *